(12) United States Patent
Le Hong et al.

(10) Patent No.: US 11,230,798 B2
(45) Date of Patent: Jan. 25, 2022

(54) WOVEN FIBROUS STRUCTURE FOR FORMING A CASING PREFORM

(71) Applicant: SAFRAN AIRCRAFT ENGINES, Paris (FR)

(72) Inventors: Son Le Hong, Moissy-Cramayel (FR); Dominique Marie Christian Coupe, Moissy-Cramayel (FR); Martin Gabillon, Moissy-Cramayel (FR); Hervé Grelin, Moissy-Cramayel (FR); Jean-Noël Mahieu, Moissy-Cramayel (FR); Sylvain Mousillat, Moissy-Cramayel (FR); Roland José Yann Mortier, Moissy-Cramayel (FR); Frédéric Raymond, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 128 days.

(21) Appl. No.: 16/642,767

(22) PCT Filed: Aug. 29, 2018

(86) PCT No.: PCT/FR2018/052117
§ 371 (c)(1),
(2) Date: Feb. 27, 2020

(87) PCT Pub. No.: WO2019/043333
PCT Pub. Date: Mar. 7, 2019

(65) Prior Publication Data
US 2020/0190711 A1 Jun. 18, 2020

(30) Foreign Application Priority Data
Aug. 30, 2017 (FR) ...................................... 1757977

(51) Int. Cl.
*D03D 25/00* (2006.01)
*D06M 23/14* (2006.01)
*F01D 25/24* (2006.01)

(52) U.S. Cl.
CPC .......... *D03D 25/005* (2013.01); *D06M 23/14* (2013.01); *F01D 25/24* (2013.01);
(Continued)

(58) Field of Classification Search
CPC .... D03D 1/0052; D03D 11/00; D03D 15/275; D03D 15/267; D03D 25/005; F01D 21/045; F01D 25/24
See application file for complete search history.

(56) References Cited

U.S. PATENT DOCUMENTS 4,696,853 A * 9/1987 Fourezon ............... D04H 3/005
442/187
5,238,728 A * 8/1993 Aucagne ................. B29C 70/24
428/109

(Continued)

FOREIGN PATENT DOCUMENTS

CN 101713115 A 5/2010
FR 3 045 448 A1 6/2017
(Continued)

OTHER PUBLICATIONS

International Search Report as issued in International Patent Application No. PCT/FR2018/052117, dated Jan. 21, 2019.
(Continued)

*Primary Examiner* — Woody A Lee, Jr.
(74) *Attorney, Agent, or Firm* — Pillsbury Winthrop Shaw Pittman LLP (57) ABSTRACT

A fibrous structure having the form of a band extending in a longitudinal direction (X) over a given length between a proximal part and a distal part and in a lateral direction (Y)

(Continued)

over a given width between a first side edge and a second side edge, the fibrous structure having a three-dimensional or multilayer weave between a plurality of layers of warp yarns or strands extending longitudinally and a plurality of layers of weft yarns or strands extending laterally, wherein a first portion of the fibrous structure present between the proximal part and an intermediate part of the fibrous structure includes carbon fiber weft yarns or strands and wherein a second portion of the fibrous structure present between the intermediate part and the distal part includes glass fiber weft yarns or strands.

10 Claims, 7 Drawing Sheets

(52) U.S. Cl.
CPC ...... *D10B 2101/06* (2013.01); *D10B 2101/12* (2013.01); *D10B 2505/02* (2013.01); *F05D 2220/32* (2013.01); *F05D 2300/614* (2013.01)

(56) References Cited

U.S. PATENT DOCUMENTS

| | | | |
|---|---|---|---|
| 5,538,781 A | 7/1996 | Rao et al. | |
| 5,672,417 A * | 9/1997 | Champenois | F01D 5/282 442/208 |
| 5,899,241 A * | 5/1999 | David | D03D 11/00 139/408 |
| 6,003,564 A * | 12/1999 | Cahuzac | D03D 13/00 139/97 |
| 8,017,532 B2 * | 9/2011 | Okada | B32B 5/12 442/205 |
| 8,322,971 B2 * | 12/2012 | Coupe | B29C 70/24 415/9 |
| 2003/0024592 A1 * | 2/2003 | Serillon | D03D 15/267 139/421 |
| 2004/0149343 A1 * | 8/2004 | Troughton | D21F 1/0045 139/383 R |
| 2007/0007386 A1 | 1/2007 | Coupe et al. | |
| 2008/0308171 A1 * | 12/2008 | Taipale | D21F 1/0045 139/383 A |
| 2010/0144227 A1 | 6/2010 | Coupe et al. | |
| 2011/0262682 A1 * | 10/2011 | Wynn | B32B 5/026 428/91 |
| 2020/0190711 A1 * | 6/2020 | Hong | D03D 1/0052 |

FOREIGN PATENT DOCUMENTS

| | | |
|---|---|---|
| RU | 2 185 469 C2 | 7/2002 |
| RU | 2 409 468 C2 | 1/2011 |
| WO | WO 98/17852 A1 | 4/1998 |
| WO | WO 2006/136755 A2 | 12/2006 |

OTHER PUBLICATIONS

Randjbaran, E., et al. "Hybrid Composite Laminates Reinforced with Kevlar/Carbon/Glass Woven Fabrics for Ballistic Impact Testing," The Scientific World Journal, vol. 2014, Jan. 2014, XP055463460, pp. 1-7.

Hosur, M. V., et al., "Studies on the low-velocity impact response of woven hybrid composites," Composite Structures, vol. 67, No. 3, Mar. 2005, XP027651510, pp. 253-262.

Office Action and Search Report as issued in Russian Patent Application No. 2020111479, dated Nov. 15, 2021.

\* cited by examiner

WOVEN FIBROUS STRUCTURE FOR FORMING A CASING PREFORM

CROSS-REFERENCE TO RELATED APPLICATIONS

This application is the U.S. National Stage of PCT/FR2018/052117, filed Aug. 29, 2018, which in turn claims priority to French patent application number 1757977 filed Aug. 30, 2017. The content of these applications are incorporated herein by reference in their entireties.

The present invention relates to a process for manufacturing a fibrous structure which can be used, in particular but not exclusively, to form the fibrous reinforcement of an aero engine fan casing made of composite material.

BACKGROUND OF THE INVENTION

The manufacture of a composite material casing begins with the production of a fibrous structure in the form of a band, the fibrous structure being produced by three-dimensional weaving between a plurality of layers of warp yarns and a plurality of layers of weft yarns. The fibrous structure thus obtained is wound over several turns on a mold or tool having the shape of the casing to be produced and held between the mold and segments forming a counter-mold so as to obtain a fibrous preform.

Once the fibrous preform has been produced, i.e. at the end of the winding of the fibrous structure, the tool carrying the fibrous preform is closed by counter-molds and then transported to an oven or furnace in which the densification of the preform by a matrix is carried out, the matrix being obtainable in particular by injection and polymerization of a resin into the fibrous preform.

Casings must provide a containment function by trapping debris ingested inside the engine, or centrifugally-projected blades or blade fragments, to prevent them from passing through the casing and reaching other parts of the aircraft.

Casings of the prior art generally perform this function satisfactorily. However, there is still room for further improvement in the mechanical resistance of certain casings to blade impact when the blade is detached and projected into the casing.

SUBJECT MATTER AND SUMMARY OF THE INVENTION

The invention relates, according to a first aspect, to a fibrous structure having the form of a band extending longitudinally over a given length between a proximal part and a distal part and laterally over a given width between a first side edge and a second side edge, the fibrous structure having a three-dimensional or multilayer weave between a plurality of layers of warp yarns or strands extending longitudinally and a plurality of layers of weft yarns or strands extending laterally, characterized in that a first portion of the fibrous structure present between the proximal part and an intermediate part of the fibrous structure comprises carbon fiber weft yarns or strands and in that a second portion of the fibrous structure present between the intermediate part and the distal part comprises glass fiber weft yarns or strands.

The first portion of the fibrous structure is rigid and the second portion of the fibrous structure is elastically deformable. The terms "rigid" and "elastically deformable" are to be understood relatively, i.e. the first portion is more rigid than the second portion, and correlatively the second portion is more elastically deformable than the first. In other words, the first portion has a higher stiffness than the second portion, the difference in stiffness being conferred by the presence of glass fibers, which are softer, and by the presence of carbon fibers, which are stiffer. Glass fibers generally have a higher elongation at break than carbon fibers: less than 2% for glass fibers, and more than 3% for carbon fibers.

In one example embodiment, the second portion of the fibrous structure may comprise more glass fiber yarns or strands than the first portion. In other words, a volume rate of glass fiber yarns or strands in the second portion may be greater than the volume rate of glass fiber yarns or strands in the first portion (the volume rate being defined in relation to the volume occupied by all the yarns or strands in the portion under consideration). The first portion of the fibrous structure may comprise more carbon fiber yarns or strands than the second portion. In other words, a volume rate of carbon fiber yarns or strands in the first portion may be greater than the volume rate of carbon fiber yarns or strands in the second portion. Only the second portion of the fibrous structure may consist of glass fiber yarns or strands.

The fibrous structure is intended to be wound in several turns to form a fibrous reinforcement for casing made of composite material. The first portion is intended to form the radially inner part of this fibrous reinforcement (first turns of the winding). The second portion is intended to form the radially outer part of this fibrous reinforcement (last turns of the winding).

The inventors found that it was possible to improve the resistance of the casing to impact with a detached blade by giving significant rigidity to the first turns of the fibrous reinforcement of the casing, and deformability to the last turns of this reinforcement, these last turns being the most stressed in terms of deformation during impact.

Thus, the fibrous structure according to the invention comprises carbon weft yarns or strands in the first portion, intended to form the beginning of the winding and located on the side of impact with the blade, in order to confer a high rigidity to this first portion. Furthermore, the fibrous structure according to the invention comprises glass weft yarns or strands in the second portion, which is intended to form the outer layer or layers of the winding, in order to confer a significant elastic deformation capacity on this second portion, and thus to be able to absorb the energy imparted by the blade by deforming and then to be able to restore this energy to the blade by returning to its initial shape.

The invention is therefore based on the use of two different materials, namely carbon and glass, located in particular zones of the fibrous reinforcement, in order to respond optimally to the stresses of the casing during a blade loss event while limiting the mass of the casing.

In an example embodiment, the glass fiber weft yarns or strands in the second portion are present on the side of an outer face of the structure.

The outer face is intended to form the radially outer face of the fibrous structure, once it has been wound to form the fibrous reinforcement of the casing.

The inventors found that, within a given turn of the wrap, the part of the structure on the outer face side was the most stressed in deformation when impacted by a detached blade.

Thus, positioning the glass weft yarns or strands on the side of this outer face further improves the resistance of the casing to the deformation imposed by the impact with a detached blade.

In an example embodiment, only part of the weft yarns or strands of the second portion are made of glass fibers, the other weft yarns or strands of the second portion are made of carbon fibers.

The fact of having in the second portion a mixed presence of glass weft yarns or strands and carbon weft yarns or strands advantageously further improves the resistance of the casing to impact with a detached blade.

In an example embodiment, the fibrous structure further comprises glass fiber warp yarns or strands present on the side of one outer face of the fibrous structure, the other warp yarns or strands of the fibrous structure being of carbon fibers.

The addition of glass warp yarns or strands further improves the resistance of the casing to the deformation imposed by the impact with a detached blade. The glass warp yarns or strands are located here on the side of the outer face which constitutes a region subjected to deformation stress, and the rest of the warp yarns or strands are made of carbon. This further improves deformability while maintaining a satisfactory level of stiffness in the fiber reinforcement.

In particular, glass fiber warp yarns or strands may be present in a central area laterally set back from the first and second side edges and which extends over a given width which is less than the width of said fibrous structure.

The central area is intended to be present opposite the blades and defines the retention area of the casing to be obtained. The function of this casing retention area is to retain debris, particles or objects ingested at the engine inlet, or blades or blade fragments detached and projected radially against the casing by centrifugation.

The glass warp yarns or strands are in the latter case located in a region of high deformation stress, i.e. on the outer side and in the central area, and the rest of the warp yarns or strands are made of carbon. This further improves deformability while maintaining a satisfactory level of stiffness in the fiber reinforcement.

In an example embodiment, the carbon fiber yarns or strands and the glass fiber yarns or strands in the fibrous structure have a similar titer.

Such a feature is advantageous because by using in the structure yarns or strands of similar size, the textile architecture is not substantially altered, thus maintaining similar wicking and similar matrix pocket sizes in the composite casing.

The invention also relates to a fibrous preform for an aircraft casing comprising a multi-turn winding of a fibrous structure as described above, the first portion being located on the side of a radially inner face of the preform, and the second portion being located on the side of a radially outer face of the preform.

The invention also relates to a gas turbine casing made of a composite material, comprising a fibrous reinforcement consisting of a fibrous preform as described above, and a matrix densifying the fibrous reinforcement.

In an example embodiment, said casing is a gas turbine fan casing.

The invention also relates to an gas turbine aircraft engine having a casing as described above.

BRIEF DESCRIPTION OF THE DRAWINGS

Other features and advantages of the invention will be apparent from the following description, which is non-limiting, with reference to the appended drawings, wherein.

DETAILED DESCRIPTION OF EMBODIMENTS

The invention generally applies to fibrous structures for manufacturing composite material casings, such casings comprising a barrel or a shell with annular flanges at their ends.

Figure 1:
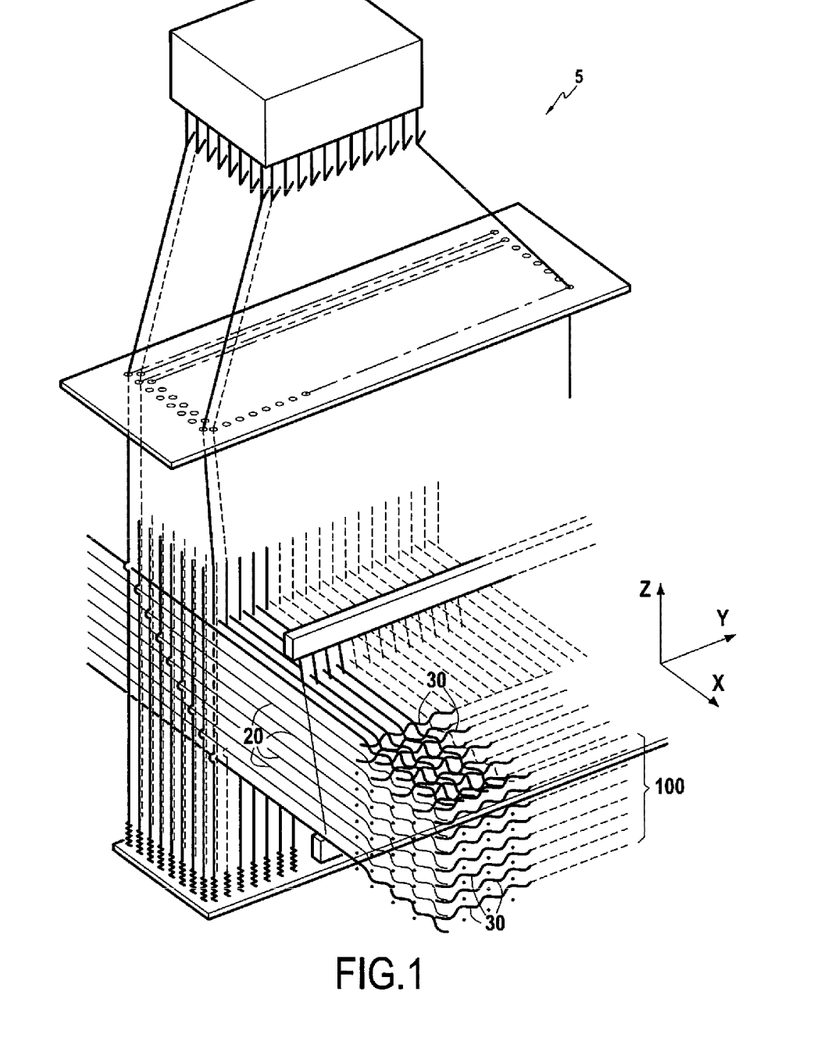
FIG. 1 is a schematic perspective view of a loom showing the three-dimensional weaving of a fibrous structure.

As shown in FIG. 1, a fibrous structure 100 is produced in a known manner by weaving using a Jacquard type loom 5 on which a bundle of warp yarns or strands 20 has been arranged in a plurality of layers, the warp yarns being joined by weft yarns or strands 30.

The fibrous structure is achieved by three-dimensional weaving. The term "three-dimensional weaving" or "3D weaving" is used here to describe a weaving method in which at least some of the weft yarns bind warp yarns to several layers of warp yarns or vice versa. The fibrous structure may have an interlock weave. An "interlock" weave is a weave in which each layer of weft yarns binds several layers of warp yarns, with all yarns in the same weft column having the same movement in the plane of the weave. Other weaves are possible.

Figure 2:
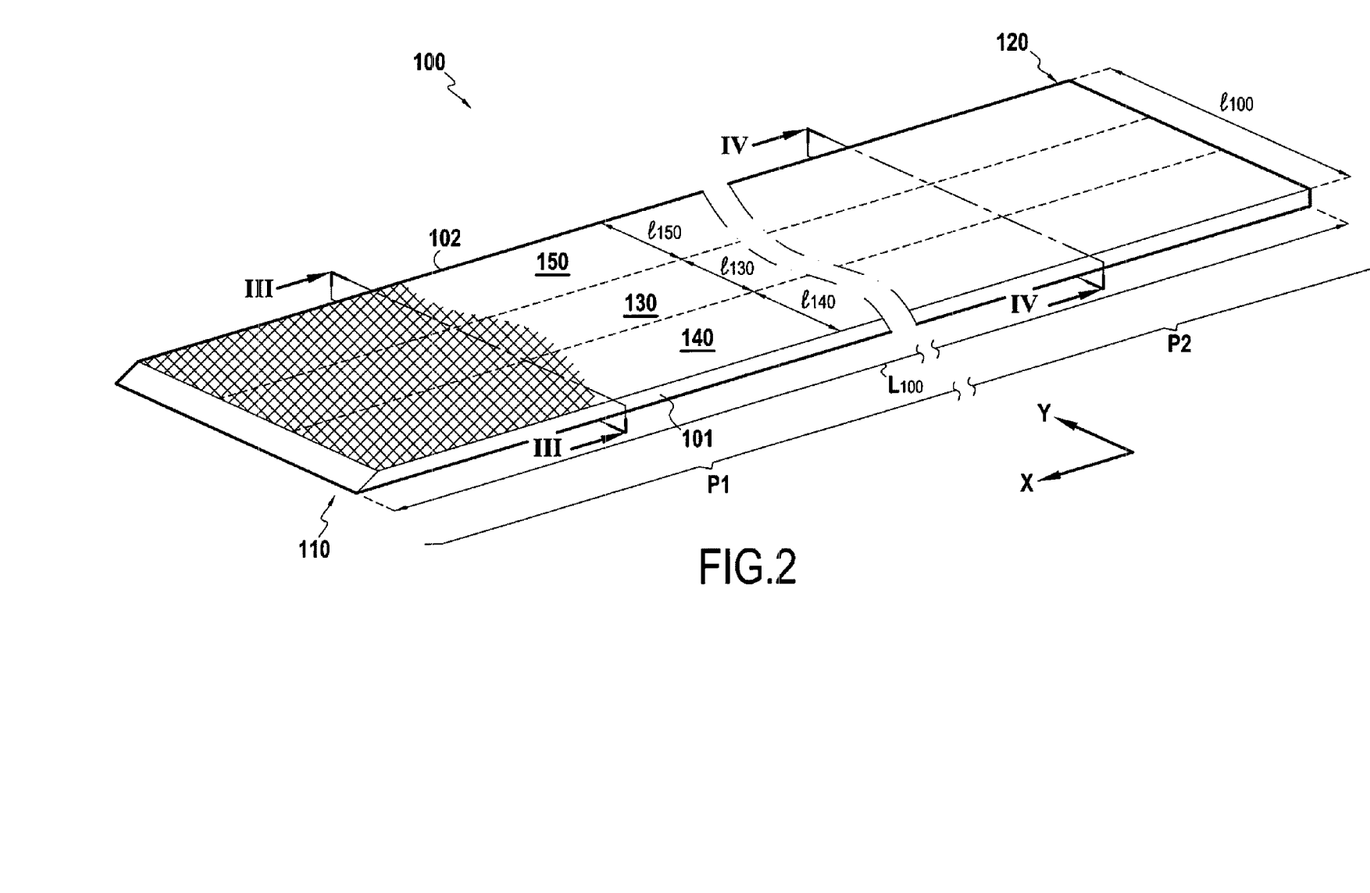
FIG. 2 is a schematic perspective view of a fibrous structure in accordance with an embodiment of the invention.

As shown in FIG. 2, the fibrous structure 100 has the form of a band which extends lengthwise in a longitudinal direction X corresponding to the running direction of the warp yarns or strands 20 and widthwise or transversely in a lateral direction Y between a first and a second side edges 101 and 102, the lateral direction Y corresponding to the direction of the weft yarns or strands 30. The fibrous structure extends longitudinally over a given length $L_{100}$ in the direction X between a proximal part 110 for forming the beginning of the winding of a fibrous preform on a forming tool and a distal part 120 for forming the end of the winding of the fibrous preform.

The fibrous structure has in addition a central zone 130 extending over a given width 1130 in the direction Y, the central zone 130 being intended to form the casing barrel or shell. The central zone 130 is intended to be present opposite the blades and defines the retention zone of the casing to be obtained. The central zone 130 is set back from the first 101 and second 102 side edges and extends over a given width 1130 less than the width $I_{100}$ of the structure 100. The central zone 130 is at an intermediate position between the first and second side edges 101 and 102. The central zone 130 is delimited between two lateral zones 140 and 150 each extending over a given width, respectively $I_{140}$ and $I_{150}$, in the direction Y. The first lateral zone 140 extends between the first side edge 101 and the central zone 130. The second lateral zone 150 extends between the second side edge 102 and the central zone 130. Each of the side zones 140 and 150 is intended at least in part to form an annular flange of the casing.

The length $L_{100}$ of the fibrous structure 100 is determined in relation to the circumference of the forming tool or mold in such a way that a certain number of revolutions of the fibrous structure can be achieved, for example four revolutions.

Figure 7:
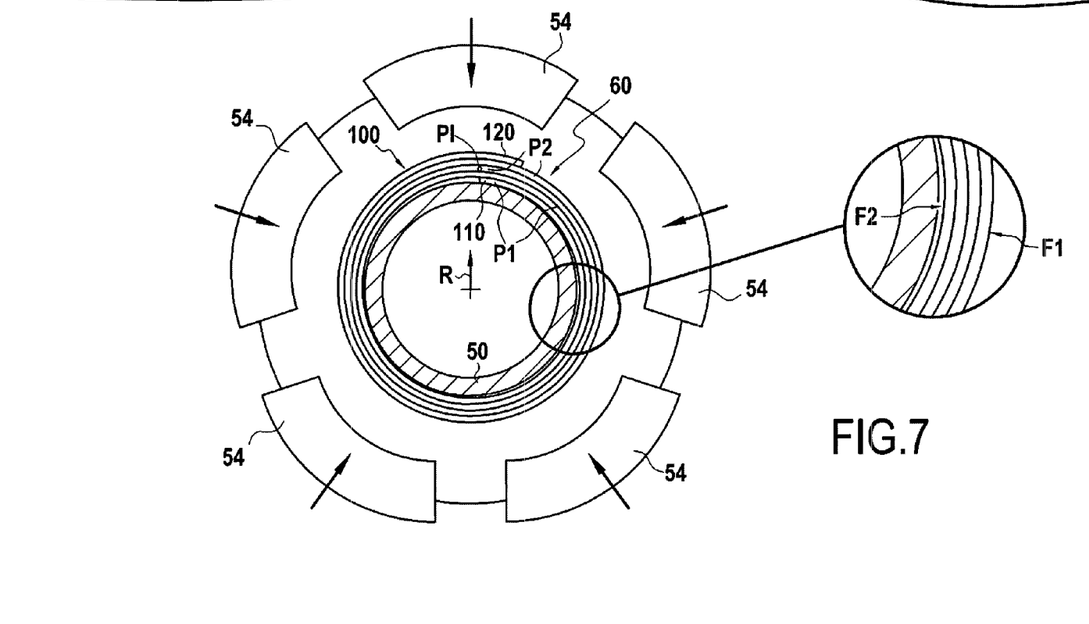
FIG. 7 is a sectional view showing the positioning of injection sectors on the casing preform in FIG. 6.

The fibrous structure 100 has a first portion P1 present between the proximal part 110 and an intermediate part PI of the fibrous structure (the intermediate part PI is visible in FIG. 7). The first portion P1 is intended to form the first part of the winding forming the fibrous reinforcement of the casing (radially inner part of this winding, see FIG. 7 which shows the radial direction R). The intermediate part PI can be located halfway along the length of the fibrous structure 100, or more generally between one quarter and three quarters of the length of the fibrous structure 100, for example.

The fibrous structure 100 further comprises a second portion P2, distinct from the first portion P1, and present between the intermediate part PI and the distal part 120. The second portion P2 is intended to form the second part of the winding forming the fibrous reinforcement of the casing (radially outer part of this winding).

Figure 3:
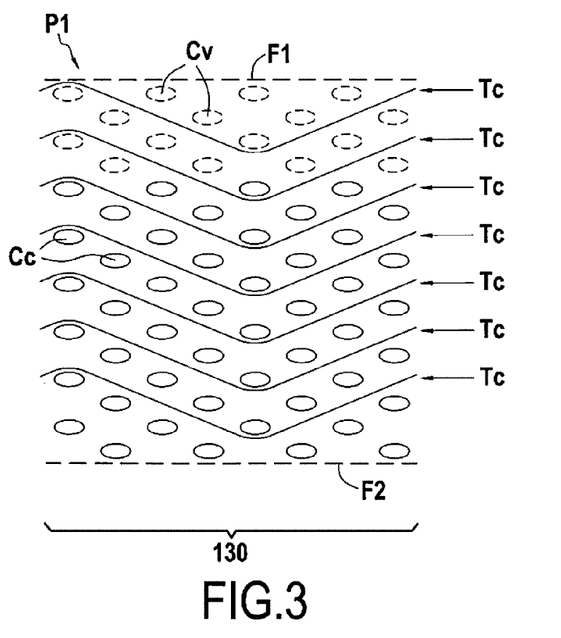
FIG. 3 is a cross-section taken at the first portion of the fibrous structure in FIG. 2 and showing a weave plane.
Figure 4:
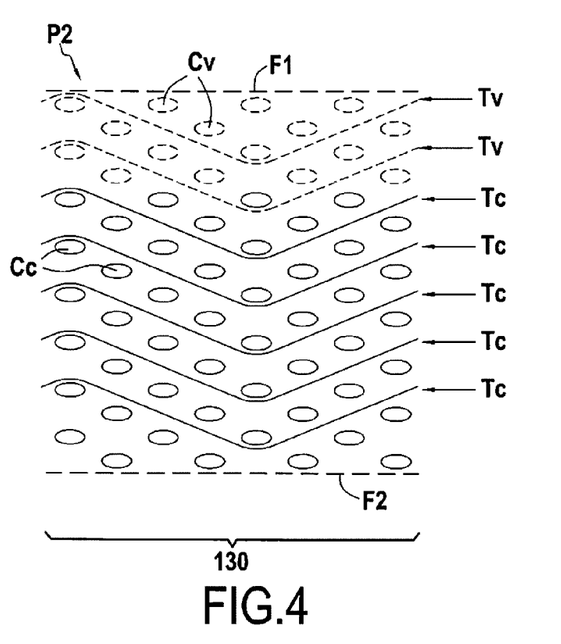
FIG. 4 is a cross section taken at the second portion of the fibrous structure in FIG. 2 and showing a weave plane.

FIGS. 3 and 4 each show a plan of the interlock weave of the fibrous structure 100 located respectively at the first portion P1 and the second portion P2.

The examples of weave designs shown in FIGS. 3 and 4 comprise 7 weft layers and 8 warp layers. In the interlock weave shown, a warp layer is formed by two adjacent warp half-layers offset from each other in the weft direction. There are therefore 16 half-layers of warp positioned in staggered rows. Each weft layer links 3 warp half-layers. Alternatively, a non-staggered arrangement could be adopted, with the warp yarns of two adjacent warp layers aligned on the same columns. Usable interlock weaves are described in the document WO 2006/136755.

As shown in FIG. 3, the first portion P1 consists of carbon fiber weft yarns or strands, denoted Tc. The entire weft yarns or strands of the first portion P1 may be made of carbon fibers.

In the example shown, the fibrous structure includes glass fiber warp yarns or strands, denoted Cv, and carbon fiber warp yarns or strands, denoted Cc.

The glass fiber warp yarns or strands Cv are present on the side of the outer face F1 of the fibrous structure. This outer face F1 is intended to form the radially outer face of the fibrous preform, once the structure has been wound (see FIG. 7). In particular, glass fiber warp yarns or strands Cv are present on the outer face F1 of the fibrous structure. The glass fiber warp yarns or strands Cv may be present at least in the central zone 130, which is the most mechanically stressed zone on impact with a detached blade, in order to give this zone optimum deformability. The glass fiber warp yarns or strands Cv may be present only in this central zone 130. Alternatively, the glass fiber warp yarns or strands Cv can be present in the central zone 130 and in the side zones 140 and 150.

In the example shown, the other warp yarns or strands of the fibrous structure are made of carbon fibers, and denoted Cc. These carbon fiber warp yarns or strands Cc are, in particular, present on the side of the inner face F2 of the fibrous structure. This inner face F2 is intended to form the radially inner face of the fibrous preform, once the structure has been wound (see FIG. 7). In particular, carbon fiber warp yarns or strands Cc are present on the side of the inner face F2 of the fibrous structure. In this example, carbon fiber warp yarns or strands are additionally present in the side zones 140 and 150.

As shown in FIG. 4, the second portion P2 consists of glass fiber weft yarns or strands, noted Tv, and carbon fiber weft yarns or strands Tc. Thus, in the example shown only part of the weft yarns or strands of the second portion P2 are made of glass fibers, the other weft yarns or strands of the second portion P2 being made of carbon fibers. However, it is not beyond the scope of the invention when all of the weft yarns or strands of the second portion are made of glass fibers. The glass fiber weft yarns or strands Tv are present on the side of the outer face F1 of the fibrous structure. In particular, glass fiber weft yarns or strands Tv are present on the outer face F1 of the fibrous structure. The carbon fiber weft yarns or strands Tc are, in particular, present on the side of the inner face F2 of the fibrous structure.

There is therefore an evolution in the nature of the weft yarns or strands when moving along the longitudinal direction X of the fibrous structure 100.

An example has just been described in which the fibrous structure has an interlock weave with 7 weft layers and 8 warp layers. However, it is not beyond the scope of the invention when the number of weft and warp layers is different, or when the fibrous structure has a different weave than an interlock weave.

As mentioned above, it is furthermore advantageous that the carbon fiber yarns or strands and the glass fiber yarns or strands present in the fibrous structure have a similar titer. The ratio $|T2-T1|/T1$ may, for example, be less than or equal to 10%, where T1 denotes the titer of the carbon fiber yarns or strands, T2 denotes the titer of the glass fiber yarns or strands, and |.| denotes the absolute value.

Figure 5:
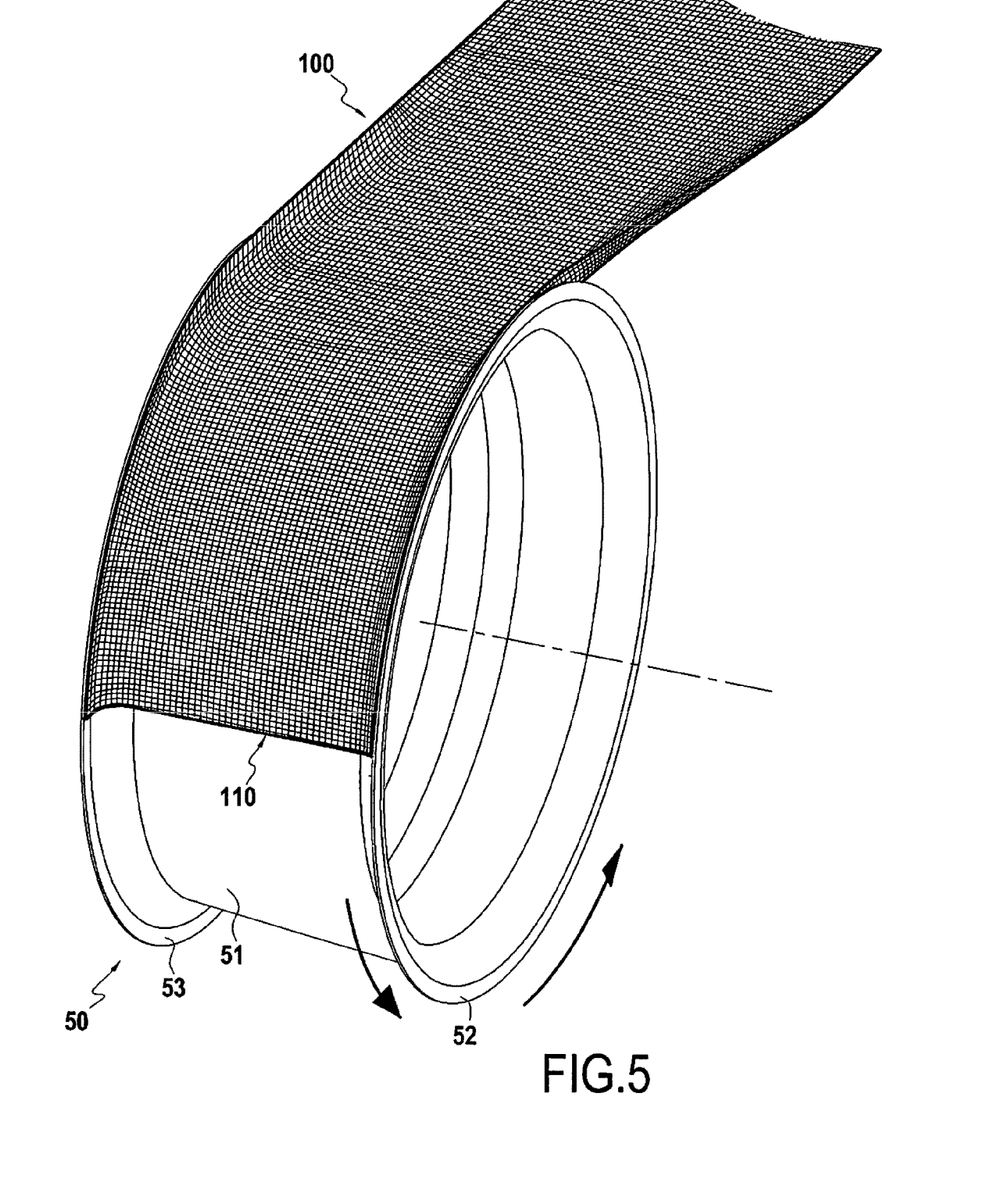
FIG. 5 is a schematic perspective view showing the winding of a fibrous structure on a forming tool.

As shown in FIG. 5, a fibrous reinforcement for a casing is formed by winding on a mandrel 50 of the previously described fibrous structure 100, the fibrous reinforcement constituting a complete tubular fibrous preform for a one-piece casing. For this purpose, the mandrel 50 has an outer surface 51 whose profile corresponds to the inner surface of the casing to be produced. The mandrel 50 also has two flanges 52 and 53 to form fibrous preform parts 62 and 63 corresponding to the casing flanges (the flanges 62 and 63 are visible in FIG. 6). The radially inward turn(s) of the preform correspond to the first portion P1 of the fibrous structure and the radially outward turn(s) of the preform correspond to the second portion P2 of the fibrous structure.

Figure 6:
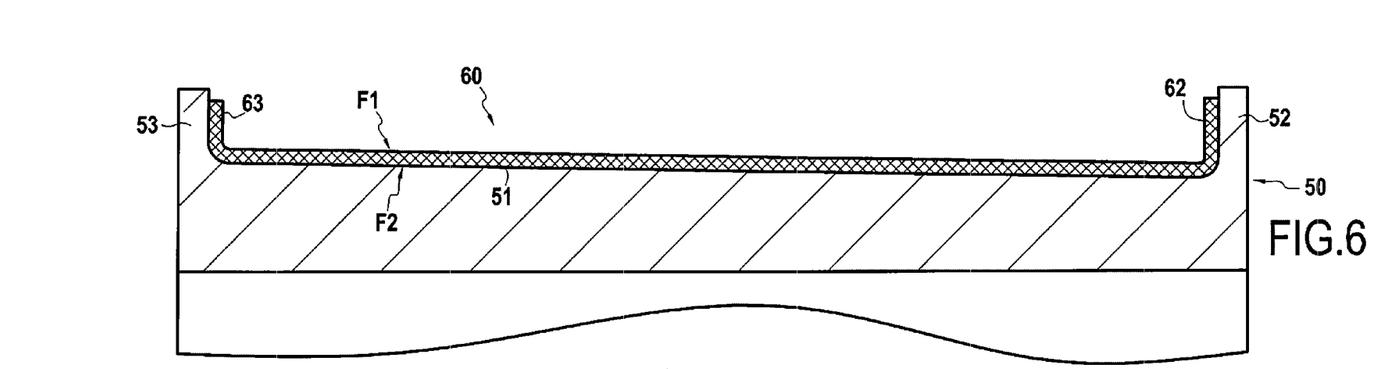
FIG. 6 is a half-view in axial section of a casing preform obtained by winding a fibrous structure as shown in FIG. 5.

FIG. 6 shows a sectional view of the fibrous preform 60 obtained after winding the fibrous structure 100 in several layers on the mandrel 50. The number of layers or turns depends on the desired thickness and on the thickness of the fibrous structure. It is preferably at least equal to 2. In the example described here, the preform 60 has 4 layers of fibrous structure 100.

The fibrous preform 60 is then densified with a matrix.

Densification of the fibrous preform consists in filling the porosity of the preform, in all or part of its volume, with the material constituting the matrix.

The matrix can be obtained in a manner known per se by the liquid process. The liquid process consists of impregnating the preform with a liquid composition containing an organic precursor of the matrix material. The organic precursor is usually in the form of a polymer, such as a resin, possibly diluted in a solvent. The fibrous preform is placed in a sealable mold with a receptacle in the shape of the final molded part. As shown in FIG. 7, the fibrous preform 60 is placed here between a plurality of sectors 54 forming a counter-mold and the mandrel 50 forming a support, these elements having respectively the external and internal shape of the casing to be produced. The liquid matrix precursor, for example a resin, is then injected into the entire receptacle to impregnate the preform.

The transformation of the precursor into an organic matrix, i.e. its polymerization, is carried out by heat treatment, generally by heating the mold, after removal of any solvent and cross-linking of the polymer, the preform being always held in the mold with a shape corresponding to that of the part to be made. The organic matrix can be obtained in particular from epoxy resins, such as, for example, the high-performance epoxy resin sold, or from liquid precursors of carbon or ceramic matrices.

In the case of the formation of a carbon or ceramic matrix, the heat treatment consists of pyrolysis of the organic precursor to transform the organic matrix into a carbon or ceramic matrix depending on the precursor used and the pyrolysis conditions. By way of example, liquid carbon precursors may be relatively high coke content resins, such as phenolic resins, while liquid ceramic precursors, especially SiC, may be polycarbosilane (PCS), polytitanocarbosilane (PTCS) or polysilazane (PSZ) resins. Several consecutive cycles, from impregnation to heat treatment, can be carried out to achieve the desired degree of densification.

The densification of the fibrous preform can be achieved by the well-known resin transfer molding (RTM) process. In accordance with the RTM process, the fibrous preform is placed in a mold with the shape of the casing to be produced. A thermosetting resin is injected into the internal space delimited between the rigid material part and the mold and which comprises the fibrous preform. A pressure gradient is usually established in this internal space between the resin injection site and the resin outlet ports to control and optimize the resin impregnation of the preform.

The resin used can be, for example, an epoxy resin. Resins suitable for RTM processes are well known. They preferably have a low viscosity to facilitate their injection into the fibers. The choice of the temperature class and/or the chemical nature of the resin is determined according to the thermomechanical stresses to which the part must be subjected. Once the resin has been injected into the entire reinforcement, it is cured by heat treatment according to the RTM process.

After injection and polymerization, the part is demolded. Finally, the part is trimmed to remove excess resin and the chamfers are machined to obtain a casing 810 with a shape of revolution as shown in FIG. 8.

Figure 8:
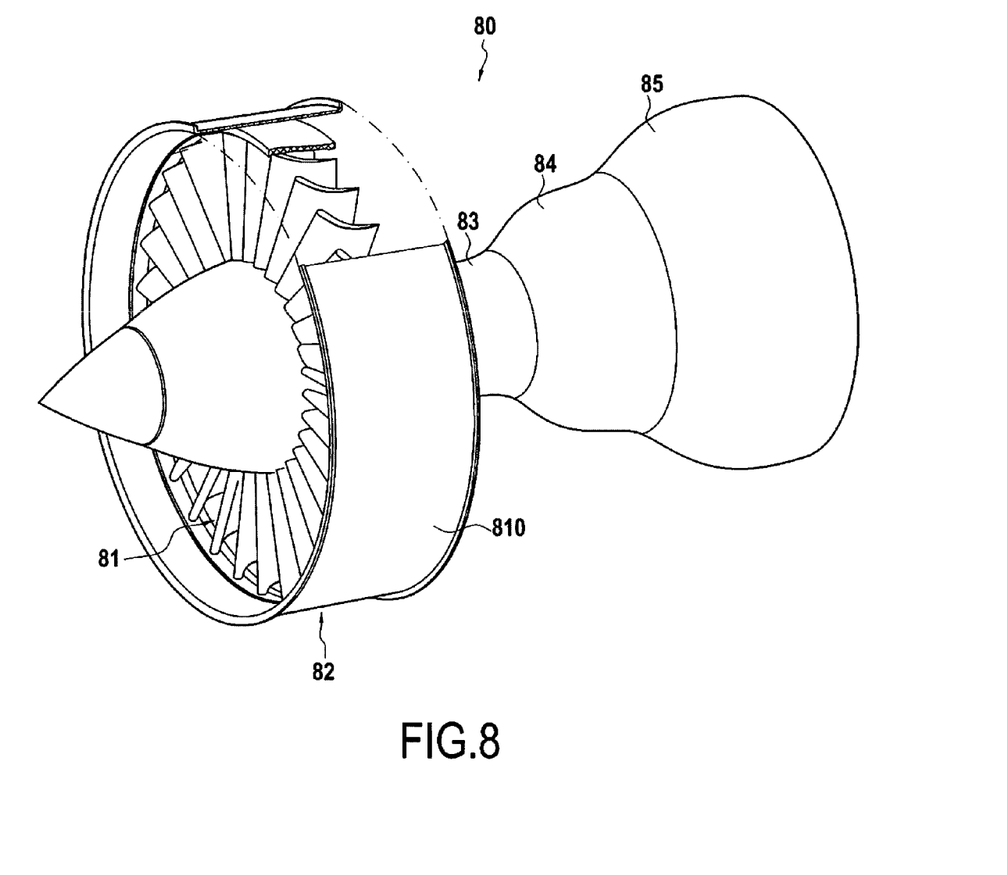
FIG. 8 is a perspective view of an aircraft engine in accordance with an embodiment of the invention.

The casing 810 shown in FIG. 8 is a casing for a gas turbine aero engine fan 80. Such an engine, as shown very schematically in FIG. 8, comprises, from upstream to downstream in the direction of gas flow, a fan 81 arranged at the engine inlet, a compressor 82, a combustion chamber 83, a high-pressure turbine 84 and a low-pressure turbine 85. The engine is housed inside a casing comprising several parts corresponding to different engine components. Thus, the fan 81 is surrounded by the casing 810.

Figure 9:
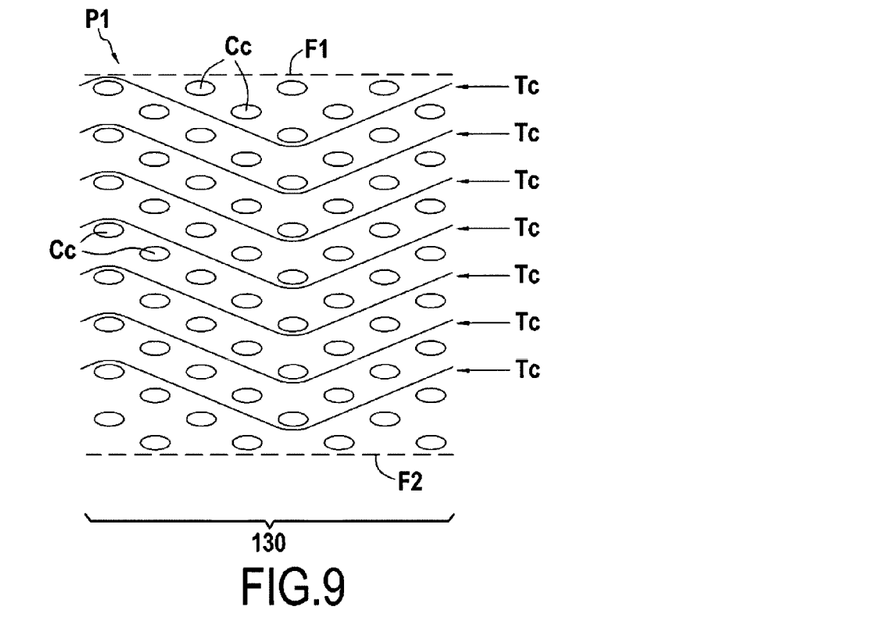
FIG. 9 is a cross section taken at the first portion of a fibrous structure variant according to the invention and showing a weave plane.
Figure 10:
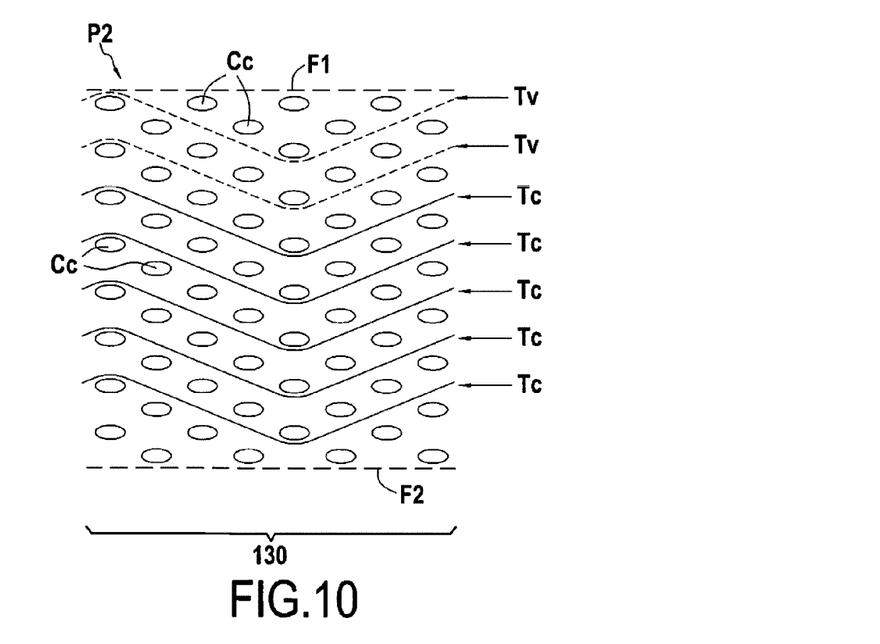
FIG. 10 is a cross section taken at the second portion of this fibrous structure variant and showing a weave plane.

FIGS. 9 and 10 show a variant of the fibrous structure according to the invention, in which all the warp yarns or strands are made of carbon (warp yarns or strands Cc).

The fibrous structure comprises in its second portion P2 glass weft yarns or strands Tv, the latter are located on the side of the outer face F1 of the structure as in the previously described embodiment. According to this illustrated example, the fibrous structure further comprises carbon weft yarns or strands Tc in the first portion P1 and in the second portion P2. All the weft yarns or strands of the first portion P1 are made of carbon, according to this example.

The invention claimed is:

1. A fibrous structure having the form of a band extending in a longitudinal direction over a given length between a proximal part and a distal part and in a lateral direction over a given width between a first side edge and a second side edge, the fibrous structure having a three-dimensional or multilayer weave between a plurality of layers of warp yarns or strands extending longitudinally and a plurality of layers of weft yarns or strands extending laterally,
wherein a first rigid portion of the fibrous structure present between the proximal part and an intermediate part of the fibrous structure comprises carbon fiber weft yarns or strands and in that a second elastically deformable portion of the fibrous structure present between the intermediate part and the distal part comprises glass fiber weft yarns or strands.

2. The fibrous structure as claimed in claim 1, wherein the glass fiber weft yarns or strands in the second portion are present on the side of an outer face of the structure.

3. The fibrous structure as claimed in claim 1, wherein only a portion of the weft yarns or strands of the second portion are made of glass fibers, the other weft yarns or strands of the second portion being made of carbon fibers.

4. The fibrous structure as claimed in claim 1, further comprising glass fiber warp yarns or strands present on the side of an outer face of the structure, the other warp yarns or strands of the fibrous structure being of carbon fibers.

5. The fibrous structure as claimed in claim 4, wherein the glass fiber warp yarns or strands are present in a central zone laterally set back from the first and second side edges and which extends over a given width which is less than the width of said fibrous structure.

6. The fibrous structure as claimed in claim 1, wherein the carbon fiber yarns or strands and the glass fiber yarns or strands present in the fibrous structure have a similar titer.

7. A fibrous preform for an aircraft casing comprising a winding over a plurality of turns of a fibrous structure as claimed in claim 1, the first portion being located on the side of a radially inner face of the preform, and the second portion being located on the side of a radially outer face of the preform.

8. A gas turbine engine casing of a composite material, comprising a fibrous reinforcement consisting of a fibrous preform as claimed in claim 7, and a matrix densifying the fibrous reinforcement.

9. The casing as claimed in claim 8, wherein said casing is a gas turbine fan casing.

10. An aircraft gas turbine engine having a casing as claimed in claim 8.

* * * * *